Sept. 16, 1969  G. R. O. PENTITH ET AL  3,467,436
TUNNELLING MACHINE WITH ROTATABLE CUTTER CARRYING
ARM FOR 360° CUTTING Filed April 7, 1967  9 Sheets-Sheet 1

INVENTORS
GERALD R. O. PENTITH
PETER LOCKWOOD

INVENTORS
GERALD R. O. PENTITH
PETER LOCKWOOD

INVENTORS
GERALD R. O. PENTITH
PETER LOCKWOOD

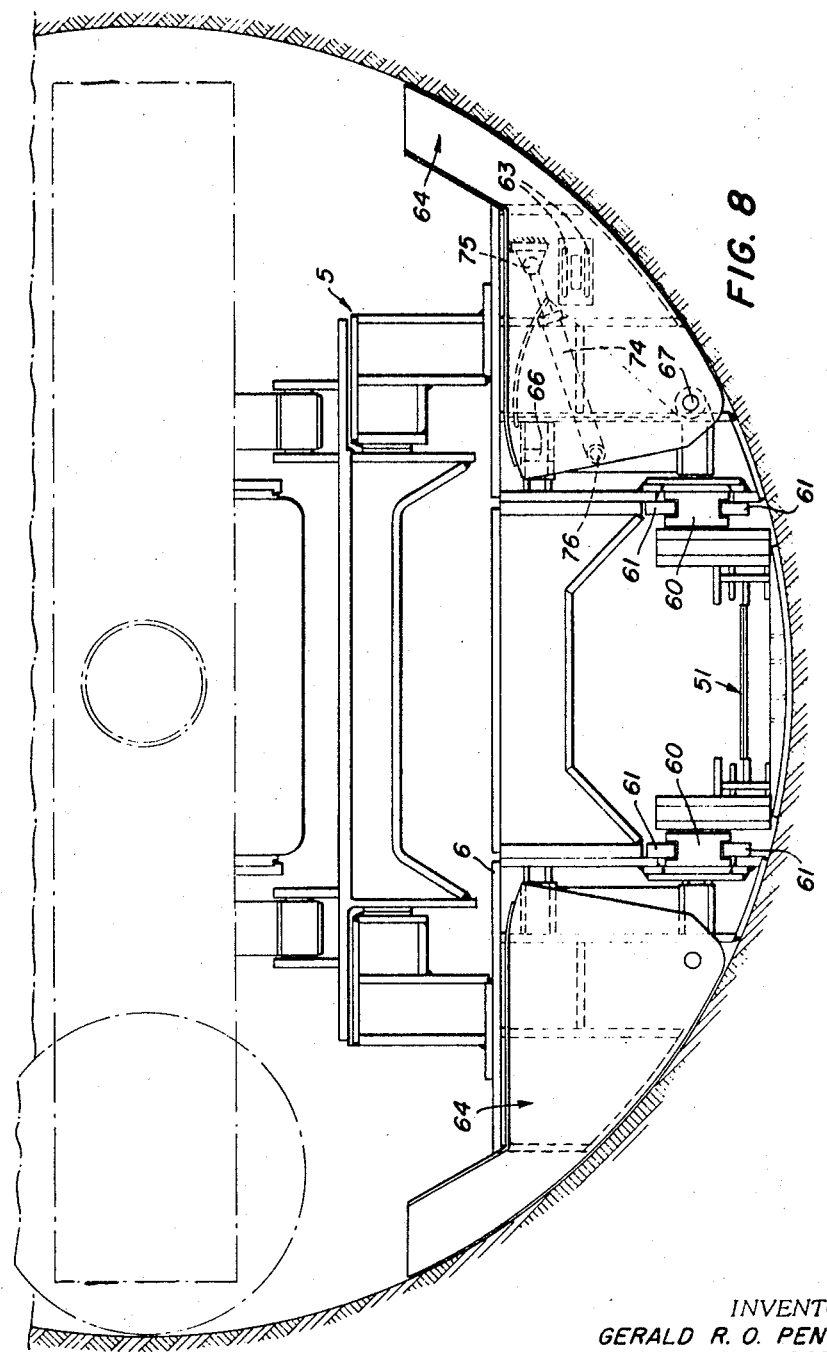

INVENTORS
GERALD R. O. PENTITH
PETER LOCKWOOD

INVENTORS
GERALD R. O. PENTITH
PETER LOCKWOOD

Sept. 16, 1969　　G. R. O. PENTITH ET AL　　3,467,436
TUNNELLING MACHINE WITH ROTATABLE CUTTER CARRYING
ARM FOR 360° CUTTING
Filed April 7, 1967　　　　　　　　　　　9 Sheets-Sheet 9

INVENTORS
GERALD R. O. PENTITH
PETER LOCKWOOD 3,467,436
**TUNNELLING MACHINE WITH ROTATABLE
CUTTER CARRYING ARM FOR 360° CUTTING**
Gerald R. O. Pentith and Peter Lockwood, Aycliffe Industrial Estate, near Darlington, England, assignors to Mining Progress Inc., New York, N.Y., a corporation of New York
Filed Apr. 7, 1967, Ser. No. 629,219
Claims priority, application Great Britain, Apr. 13, 1966, 16,100/66; July 20, 1966, 32,497/66
Int. Cl. E21c *27/36, 29/00;* E21d *23/08*
U.S. Cl. 299—31                                     24 Claims

ABSTRACT OF THE DISCLOSURE

Tunnelling machine comprising a frame, support means for the frame which include advancing and retracting means for the frame, an arm mounted forwardly of the frame, being rotatable about an axis extending lengthwise of the frame as well as advanceable and retractable with respect to the frame, the arm extending radially from such axis and forming a radial slideway on which a carrier is mounted, a pick-carrying rotary cutting head mounted on the carrier and rotatable about an axis parallel to the axis of rotation of the arm, means for moving the carrier along the arm and for retaining the carrier at any position to which it is moved, means for rotating the arm such that the cutting head may remove mineral over 360° about the axis of rotation of the arm, means for advancing and retracting the arm with respect to the frame, and means for rotating the rotary cutting head, preferably with an overhead articulated primary roof support system and/or a secondary roof support system operatively associated with the tunnelling machine, and preferably with conveyor means advanceable and retractable with respect to the machine for removing mineral extracted by the cutting head from the site of tunnelling operations, such conveyor means optionally having loading means forwardly of the machine to enhance the leading of extracted mineral onto the conveyor means.

---

This invention relates to tunnelling machines and is particularly directed to a machine capable of effecting tunnelling as a substantially continuous operation in rock, in contrast to the usual sequential operations of drilling, shot-firing, and rock removal.

According to the present invention, a tunnelling machine comprises a frame, support means for the frame, the support means including power-actuated advancing and retracting mechanism for the frame, an arm mounted forwardly of the frame and rotatable about an axis extending lengthwise of the frame, the arm extending radially from the axis and being constituted as a radial slideway, a carrier mounted on the slideway, a pick-carrying rotary cutting head mounted on the carrier and rotatable about an axis parallel to the axis of rotation of the arm, means for moving the carrier along the arm and for retaining it at any position to which it is moved, means for rotating the arm such that the cutting head may remove material over 360° about the axis of rotation of the arm, means for advancing and retracting of the arm with respect to the frame, and means for rotating the rotary cutting head.

With the frame presented to the rock to be tunnelled and the axis of rotation of the arm coincident with the axis of the desired tunnel section, advancing of the arm brings the cutting head into operative contact with the rock face at whatever the position occupied by the head along the arm in whatever the angular position occupied by the arm in relation to the front of the machine; and continued advancing of the arm causes the cutting head to penetrate the rock in an axial direction. Although the cutting head could initially occupy a position in which it was coaxial with the axis of rotation of the arm, it can occupy any radial position, up to that corresponding to the outermost limit of movement of the carrier along the arm. With the carrier secured in any such radial position, rotation of the arm about its axis causes the cutting head axis to perform an arcuate movement, so that the head removes rock in an arcuate path, the radial dimension of which equals the overall cutting diameter of the head. Assuming that the head is at its outermost limit on the arm, the outside of the arcuate path cut defines the diameter of the tunnel to be cut, and inside the cut path remains uncut rock centrally of the tunnel section, which can be removed by re-positioning the cutting head appropriately nearer to the axis of rotation of the arm and then rotating the arm. Depending upon the diameter of the cutting head in relation to the desired tunnel diameter, the head may be re-positioned along the arm as many times as are necessary to enable it to remove rock over the entire section by successive rotations of the arm. The above-indicated procedure can be reversed; the cutting head may first attack the centre of the section, and then deal progressively with rock nearer the periphery of the section. It is also possible for the cutting head to make a radial cut, with the arm held stationary, and for rock removal to be performed by any combination of arcuate cuts and radial cuts.

Advantageously, the arm extends radially in opposite directions in relation to its axis of rotation, so that the cutting head can be moved to one side or the other as desired, or progressed to or positioned at any position from one end of the arm to the other.

Thus a link mechanism such as that described in our British patent specification 1,039,984, which corresponds to U.S. Patent 3,306,663, may be employed to rotate the arm through 180° after which, with the cutting head moved to the other side of the arm beyond the axis of rotation, reverse movement of the link mechanism rotates the arm through 180° in the reverse direction and causes the cutting head to complete a 360° cut. Alternatively the arm may be completely rotated through 360° by providing a ring gear secured to the arm driven by a pinion slidably secured to the machine. Preferably the pinion is rotated by a slow speed hydraulic motor and associated reduction gear-box also slidably mounted on the machine frame.

Preferably, the machine includes means for adjusting the location of the axis of rotation of the arm with respect to the horizontal, so that the direction of forward advance of cutting can be adjusted in the vertical sense. Thus, the frame may be transversely pivoted on the support means, with means provided to rock the frame for adjustment of the axis of rotation of the arm, either in line with the frame or canted upwardly or downwardly as necessary for desired vertical "steering."

For horizontal advancing and "steering" of the machine, double support means may be provided, a lower support means to rest on the floor of the tunnelled section, and an upper support means with freedom to cant to one side or the other of the lower support means. Thus, in addition to the provision in the lower support means of self-advancing and retracting mechanism for the whole machine (e.g., hydraulically actuated jacks, rams and skid-plates as in our British patent specification 1,039,983, which also corresponds to said U.S. Patent 3,306,663, the upper support means may have its own similar mechanism to effect swivelling of itself and the frame.

The arm for carrying the cutting head may be carried by a torque tube rotatable in the frame, with means for advancing and retracting the torque tube, e.g., as in our British patent specification 1,039,981, which again corresponds to said U.S. Patent 3,306,663.

For location and securing of the machine in the tunnelled section, the frame (or upper support means for the frame) may be provided with an overhead articulated primary roof-support system, with means for urging the elements of the system to the roof of the section. The elements may be curved plates to form a protective canopy over a substantial part of the machine. When the machine is to be advanced, the system is first released, to be urged again to the roof when the advance has been completed.

It has been found that when tunnelling in certain materials it is necessary, because of the unstable characteristics of those materials, to provide support for the tunnel roof by an overhead system continuously i.e., when the machine is advancing rather than only when the machine is tunnelling.

Accordingly, a secondary roof support system may be provided including two horizontal and parallel roof support beams carried by the upper portions of hydraulic piston and cylinder units situated substantially vertically on either side of the machine, the units seating on the floor of the tunnel being driven and having transverse support means, and serving to urge the beams to the tunnel roof. Alternatively, the secondary roof supports system may consist of an articulated system including elements in the form of curved plates and hydraulic piston and cylinder units situated substantially vertically on each side of the machine secured at their upper ends to an overhead element of the articulated system, and at their lower ends to a lower element of the articulated system, with a transverse piston and cylinder unit secured substantially horizontally across the upper ends of two vertical hydraulic piston and cylinder units on opposite sides of the machine, the hydraulic units serving to urge the elements to the roof and walls of the tunnel.

Preferably either secondary support system is attached to the machine frame by double acting hydraulic actuated piston and cylinder units.

Thus, when the machine has cut into the face as far as possible from where it is positioned, with the hydraulic units of the secondary roof support system actuated to force the parallel beams to the roof or the curved elements to the roof and walls of the tunnel being driven, the frame supported primary articulated system may be collapsed so that the machine can be advanced. The means for advancing the machine may take the form of jacks and skid plates as described in our British patent specification 1,039,981.

When the machine reaches a suitable new position the means for urging the primary articulated system towards the roof of the tunnel already driven is activated so that the machine is located and secured again. The hydraulic units of secondary support system may then be released so that the system may be advanced towards the machine by actuation of the double acting units.

This sequence of operation of advancing the machine with a primary and secondary roof support system may be repeated any number of times depending on the amount of advance required. One convenient distance of advance may be in the order of 1 ft. at a time.

Thus reverse operation of the jacks and skid plates achieves reverse movement of the machine and reverse actuation of the double acting units achieves reverse movement of any secondary roof support system which may be employed.

Hydraulic supply to all the piston and cylinder units may be taken from the usual hydraulic supply generated by the electric motor of the machine for its other operations, The machine preferably includes a conveyor for the removal of rock to the rear substantially continuously with the detachment of the rock by the cutting head. To enable the conveyor to receive rock from close to the face under attack, and yet to permit operation of the cutting head down to floor level, the conveyor is preferably mounted so that it can be advanced and retracted with respect to the main machine. Thus, the conveyor may be mounted on the lower support means indicated above, and pass centrally under the machine between the skid-plates. A scraper chain conveyor with an elevated rear end permits ready transfer of rock to a main conveyor, advanced in the rear of the machine in the section already tunnelled.

For gathering of rock from the width of the tunnel section to a centrally disposed conveyor, curved side plates curved sections of scraper chain construction or hinged flaps, may be disposed at each side of the front of the conveyor. Preferably, if hinged flaps are employed they are secured at one end on a substantially vertical pivot adjacent the central conveyor and movable towards and away from the conveyor by hydraulic piston and cylinder units. To assist the advance of the conveyor and to enable it to be self-locking as regards rock lying on the floor as the conveyor is pushed over the floor towards the face under attack, an oblique pusher plate may be mounted across the front of the conveyor. The curved side plates, conveyors or hinged flaps may be similarly fitted with oblique pusher plates.

The invention will now be further described in greater detail by way of example with reference to the accompanying drawings in which:

FIGURE 8 is a view to a larger scale of the bottom half of FIGURE 3, showing a pivoted flap loading device;

Figure 1:
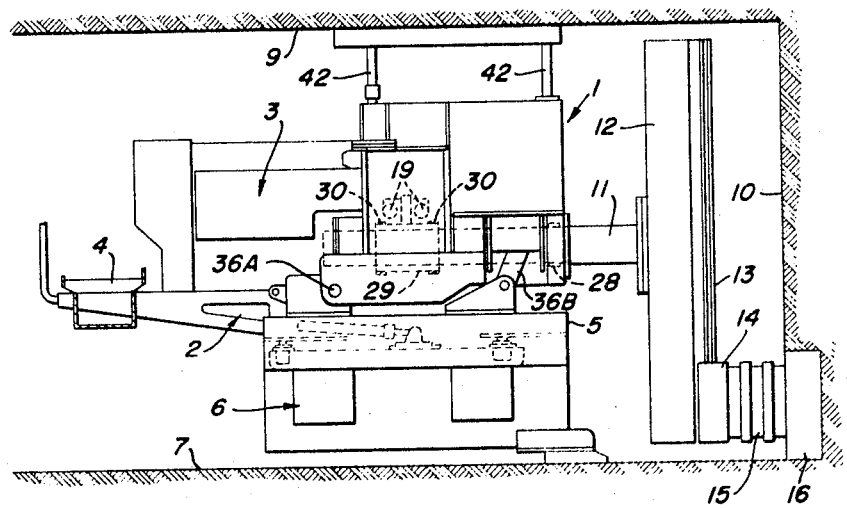
FIGURE 1 is a side elevation of a tunnelling machine with the primary and secondary roof support systems omitted, with the arm rotatable by a link mechanism and extending in opposite directions from the axis of rotation and with curved side plates to load the central conveyor.
Figure 2:
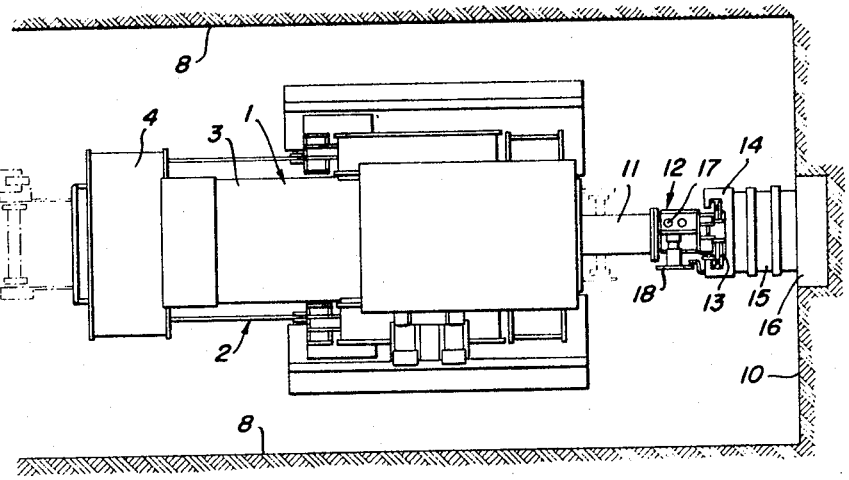
FIGURE 2 is a plan view of FIGURE 1.
Figure 3:
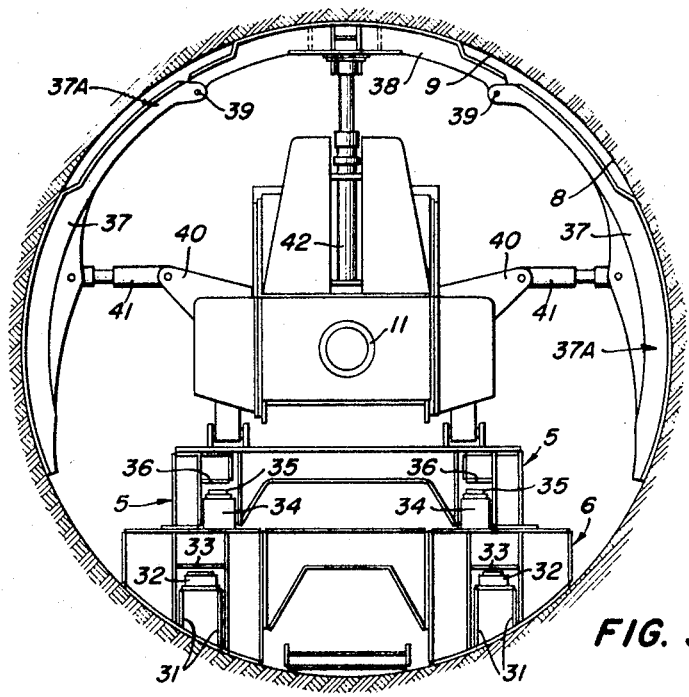
FIGURE 3 is an end elevation of FIGURE 1 and showing a primary articulated roof support system.
Figure 9:
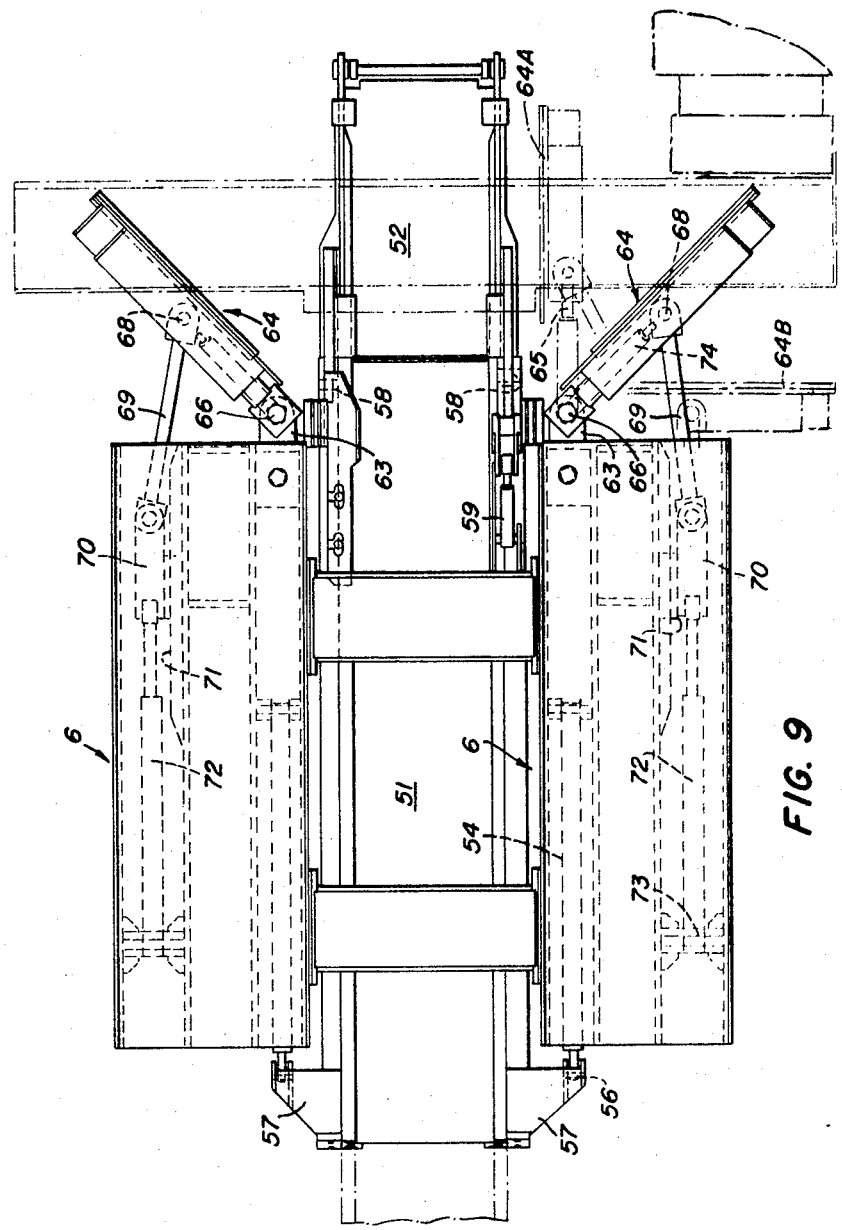
FIGURE 9 is a plan view of FIGURE 8.
Figure 10:
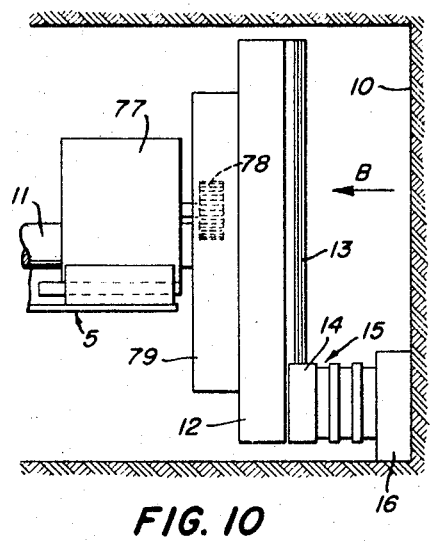
FIGURE 10 is a view corresponding to the right hand side of FIGURE 1 but showing a ring gear arrangement for rotating the arm.
Figure 11:
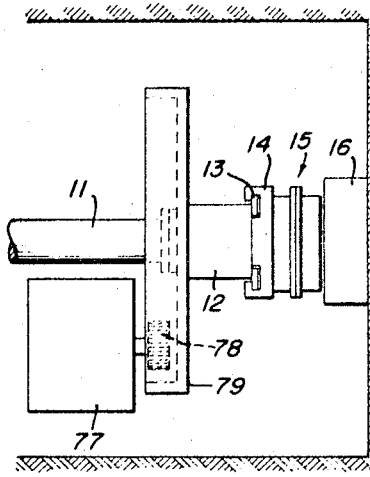
FIGURE 11 is a plan view of FIGURE 10.
Figure 13:
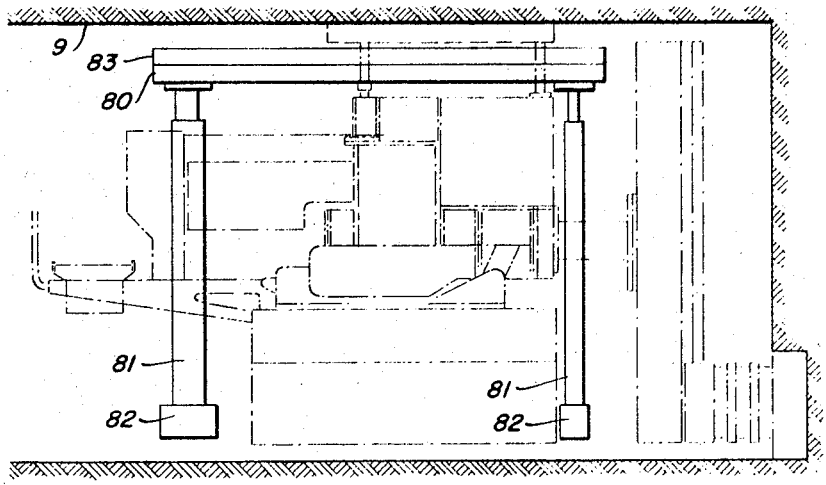
Figure 14:
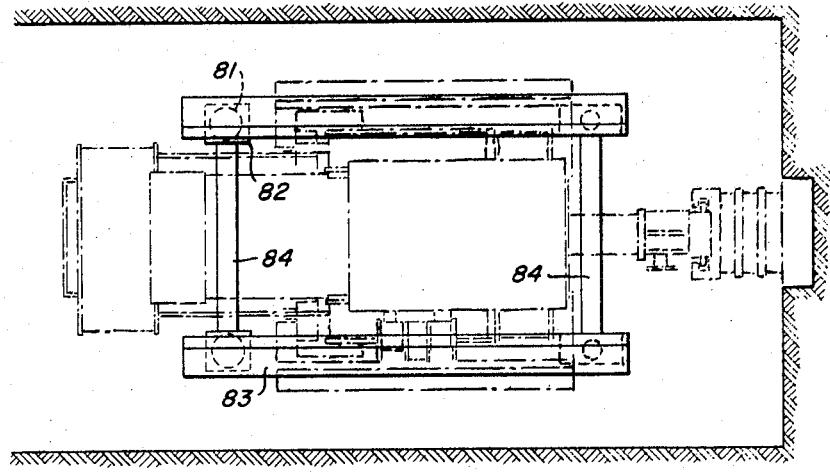
Figure 15:
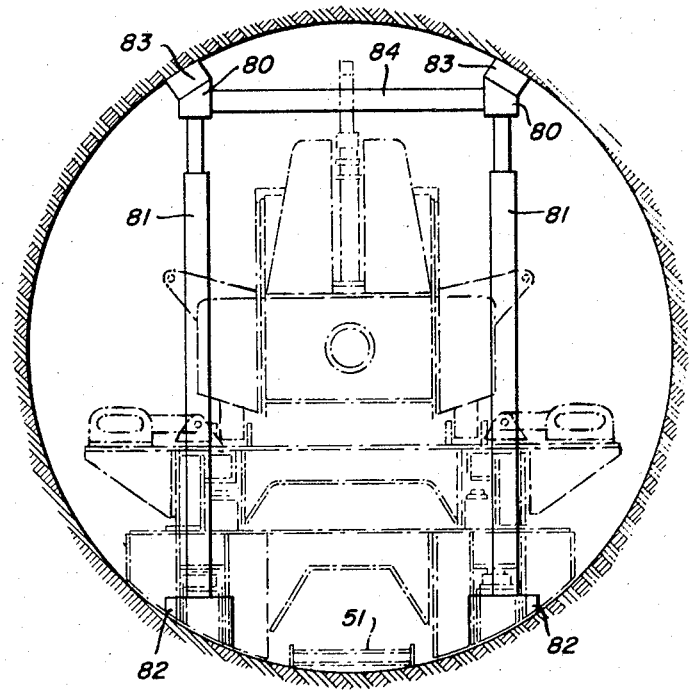

FIGURES 13 to 15 correspond to FIGURES 1 to 3 and show an alternative secondary roof support system with the machine in chain-dotted line;

FIGURES 16A to 16J show a method of operating the machine of FIGURES 1 to 3; and FIGURES 17A to 17E show a method of operating the machine of FIGURES 9 to 11.

As can be seen in FIGURES 1, 2 and 3 the machine is indicated generally at 1 and has a frame 2 including a power unit 3 controlled from an operators platform 4, the frame seating on lengthwise supports 5 spaced apart and parallel to each other which rest on support means in the form of a support platform 6, in turn resting on the tunnel floor 7, tunnel walls being indicated at 8, roof at 9 and face to be removed at 10. A torque shaft 11 protrudes from the front of the machine and carries a beam 12 provided with a slideway 13 along which is slidably mounted a carrier 14 which serves to carry a hydraulic motor and gearbox unit 15, which serve to rotate a cutting head 16 provided with picks (not shown). The carrier 14 is movable along the slideway by means of piston and cylinder units 17, chains and chain sprocket 18 in a manner described in greater detail in our British patent specification 1,039,981.

The torque shaft 11 is rotatable through 180° by two hydraulic piston and cylinder units 19 which lie substantially horizontally across the frame 2 above the torque shaft 11, the piston rods 20 (FIGURES 4A to 4C) of the units being pivoted at 21 intermediately on a curved lever 22 mounted on a fixed pivot 23 in the frame 2. The lever 22 is pivoted at 24 to a curved link 25 pivoted at 26 to a lever 27 integral with the torque shaft 11. This rotating mechanism is described in greater detail in our British patent specification 1,039,984.

The torque shaft 11 is secured forwardly in bearings 28 and rearwardly by surrounding torque tube 29 in bearings 30, along which the shaft can be slid by means of a hydraulic piston and cylinder unit (not shown) as described in greater detail in our British patent specification 1,039,981.

The machine is self-propelled by providing the support platform 6 with floats 31 and jacks 32 and skid and support plates 33 and associated piston and cylinder units (not shown) to effect a walking movement, forwards or backwards, as described in our British patent specification 1,039,983. Similar floats 34, jacks 35 and skid and support plates 36, together with transverse pivot pins 36A and jacks 36B provide for horizontal or vertical movement of the machine respectively on the machine platform 6.

An overhead articulated primary roof support system is indicated at 37A (FIGURES 3, 5 and 6) formed by two curved side plates 37 and curved roof plate 38, these three plates being secured together on pins 39. Brackets 40 project from each side of the machine in forward and rearward positions to pivotally secure one end of a piston and cylinder unit 41, the other end of each of which is secured to a side plate 37 to urge the latter to the walls 8 of the tunnel. The plate 38 is urged toward the roof of the tunnel by a pair of substantially vertical piston and cylinder units 42 again mounted in forward and rearward positions on the machine frame.

Figure 5:
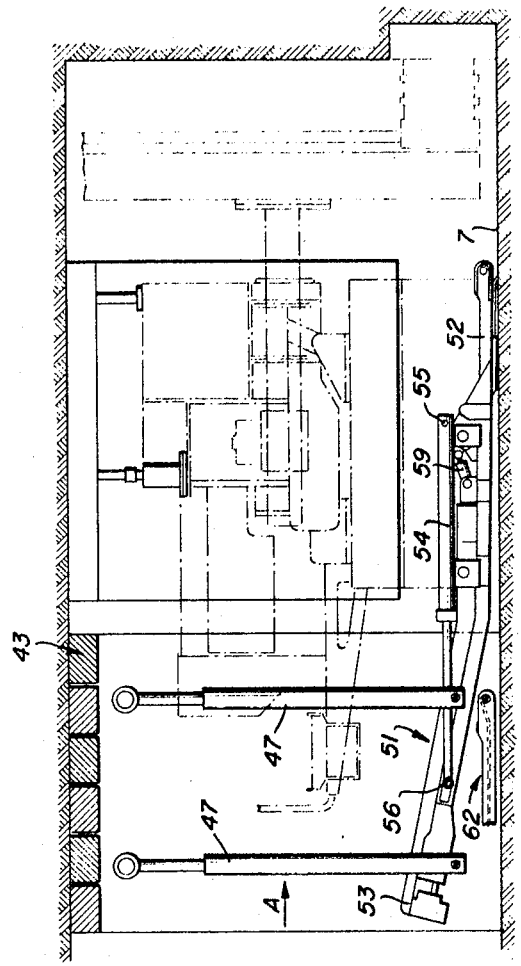
FIGURE 5 is a side elevation corresponding to FIGURE 1 but showing the machine in chain-dotted line and primary and secondary roof support systems in full.
Figure 12:
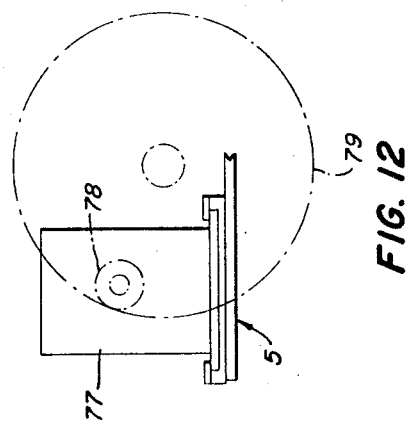
FIGURE 12 is a view in the direction of arrow B of FIGURE 10 with, for clarity, the arm and cutting head removed.
Figure 6:
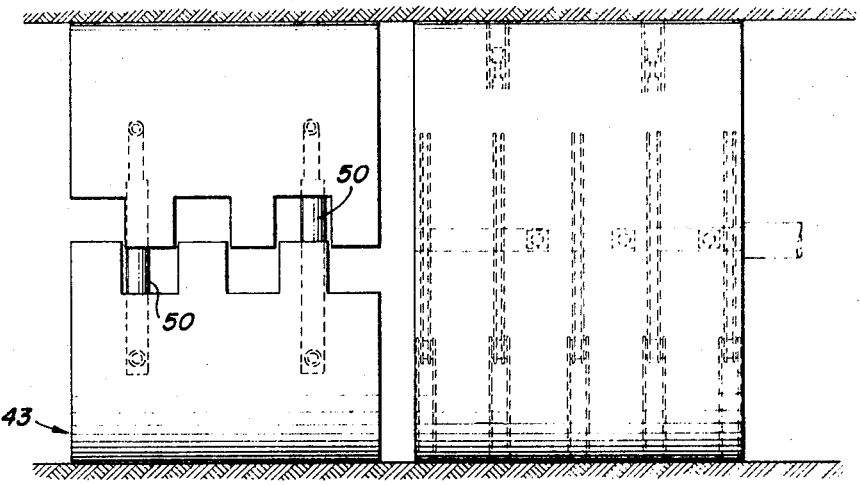
FIGURE 6 is a plan view of FIGURE 5.
Figure 7:
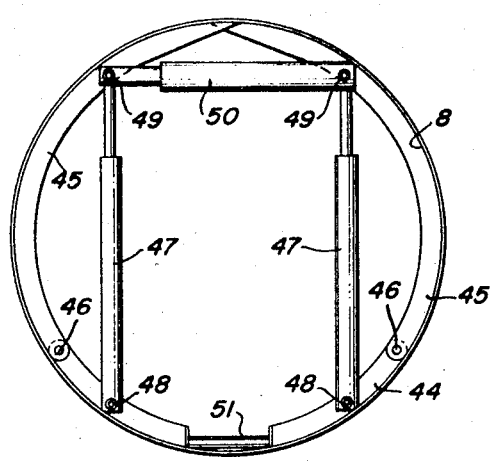
FIGURE 7 is a view in the direction of arrow A of FIGURE 5 showing only a secondary roof support system corresponding to the view of the primary system shown in FIGURE 3.

A secondary roof support system is indicated at 43 in FIGURES 5, 6 and 7, is attached to the frame 2 by piston and cylinder units, and is formed by curved plates 44, 45, pinned together at 46. At each side of the tunnel section and in forward and rearward positions are provided substantially vertical piston and cylinder units 47, pinned to the plates 44 at 48 and to the plates 45 at 49. Secured between the pins 49 is a piston and cylinder unit 50, the units 47 and 50 serving to urge the plates 44, 45 to the walls 8 and roof 9 of the tunnel.

To remove material dislodged by the cutting head 16 an advanceable and retractable conveyor 51 (FIGURES 5, 7, 8 and 9) with a forward end 52, and an elevated rear discharge end 53 is located centrally of the support platform 6. The conveyor is advanced or retracted by means of a piston and cylinder units 54 disposed substantially horizontally on each side of the conveyor and pinned at 55 to the support platform 6 and at 56 to brackets 57 extending from each side of the conveyor, the conveyor being shown retracted in FIGURE 5 and advanced in FIGURE 9. The forward end 52 of the conveyor is pivotally secured on pins 58 about which it may be moved by a pair of piston and cylinder units 59. An H-section slider 60 (FIGURE 8) secured to each side of the conveyor fits in blocks 61 secured to the support platform to guide the conveyor during its advancing or retracting movement. The elevated end 53 discharges onto a main conveyor 62. At each side of the forward end of the support platform 6 a projection 63 enables a hinged loader flap 64, through slidable connection 65, to be pinned at 66 on a substantially vertical axis, and at 67 on a substantially horizontal axis. In FIGURE 9 the flaps 64 are shown in an intermediate position, positions of the nearest approach to and farthest distance from the conveyor being indicated at 64A and 64B respectively. Pivotally secured at 68 to each flap 64 is one end of a connecting rod 69 the other end of which is secured to a slide block 70 movable along slideway 71 by means of a piston and cylinder unit 72 pinned at 73 to the support platform 6. A piston and cylinder unit 74 is pivotally secured at 75 to each flap 64 the other end of each unit being secured at 76 to the support platform 6.

Figure 4A:
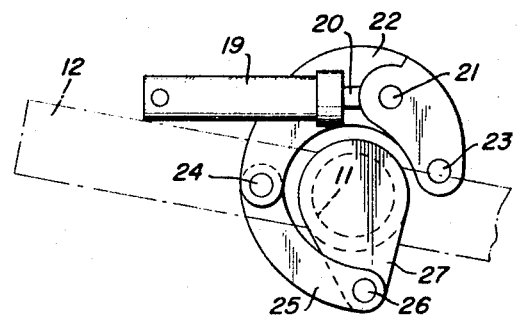
FIGURES 4A to 4C show in detail the link mechanism of FIGURES 1 to 3.
Figure 4C:
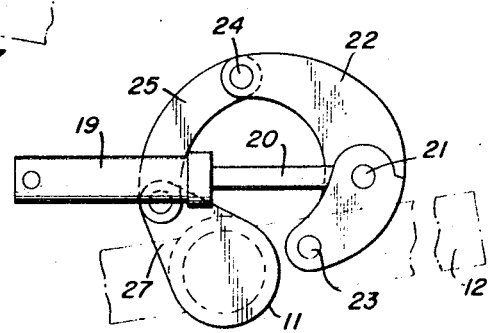
Figure 4B:
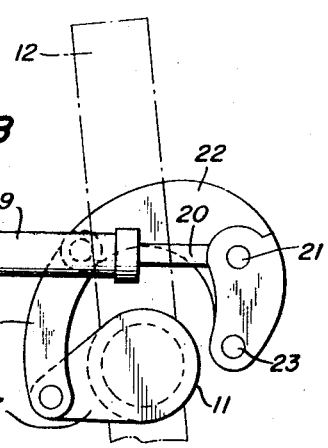

As an alternative to the link mechanism detailed in FIGURES 4A to 4C, for rotating the arm, the arm may be rotated continuously by a slow speed hydraulic motor and reduction gear-box indicated at 77 to drive a pinion 78 meshing with a ring gear 79 co-axial with and secured to the torque shaft, the motor and gearbox being slidably mounted on the machine frame so that they may advance as and when the torque shaft 11 advances.

An alternative to the secondary roof support system indicated in FIGURES 5 to 7 is shown in FIGURES 13 to 15. This system operates more over the machine proper than the previously described system and consists of two horizontal and parallel roof support beams 80 carried by the uppermost ends of substantially vertical hydraulic piston and cylinder units 81 on either side and forwardly and rearwardly of the machine. Each unit 81 is provided with a foot 82 to contact the floor 7 of the tunnel and a head 83 to contact the roof 9 of the tunnel. To provide support and rigidity in the structure a transverse support beam 84 spans the heads 83 of the forward units 81 with a similar beam spanning the heads 83 of the rearward units 81. Necessarily slots or apertures (not shown) must be provided in the plates of the primary roof support system so that the machine can be advanced with the units 81 stationary.

FIGURES 16A to 16J show one typical cutting pattern for the machine of FIGURES 1 to 3 in say, a 13 foot diameter tunnel, and the following is a description of this cutting pattern and the general operation of the machine.

Figure 16A:
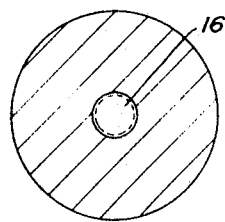
Figure 16B:
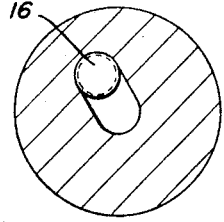
Figure 16C:
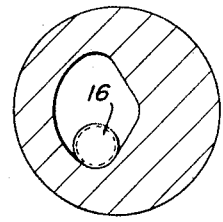
Figure 16D:
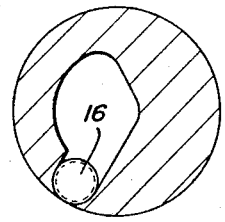
Figure 16E:
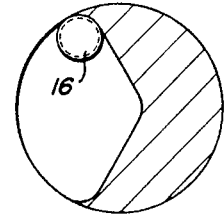
Figure 16F:
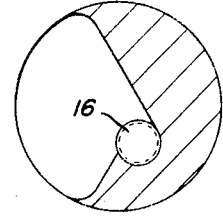
Figure 16G:
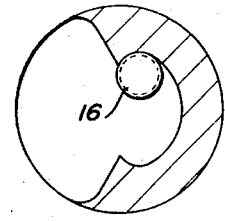
Figure 16H:
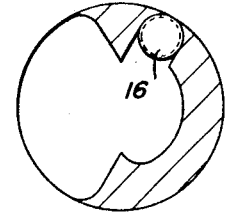
Figure 16I:
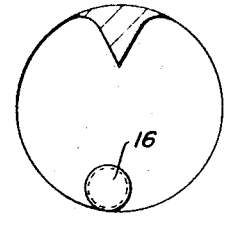
Figure 16J:
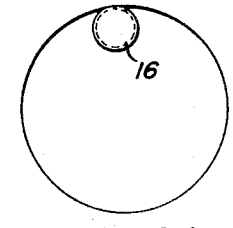

The first operation is shown in FIGURE 16A. With the beam 12 at 35° to the vertical the head 16 commences cutting and a sumping force is applied by advancing the torque shaft 11 until a cutting depth of say, 12 inches is obtained. Then, by traversing the drum 16 along the slideway 13 of the beam 12 by means of the piston and cylinder units 17, for a distance of 2 feet 3 inches, the head cuts out of the sumping position, FIGURE 16B, and traverses outwards along the beam. The beam is then rotated by actuation of units 19 until the beam approaches the conveyor 51, the latter in an advanced position so that it receives as much as possible of the detached material directly, and so that the flaps 64 may be moved by piston and cylinder units 72 between positions 64A, 64B to load the conveyor and hence remove the detached material. Thus the position shown in FIGURE 16C is reached. Then, as shown in FIGURE 16D, the cutting head is traversed outwards along the beam until the head 16 reaches the limit of tunnel diameter and with the beam rotated in the opposite direction by reverse actuation of units 19, the cutting head is located in the position shown in FIGURE 16E. The head then traverses down the beam and cuts past the sumping position for a distance of 2 feet 3 inches as shown in FIGURES 16F and cuts out the arc as shown by FIGURE 16G and as described with reference to FIGURES 16B, 16C. Then the sequence as described with reference to FIGURES 16D, 16E is repeated as shown by FIGURES 16H and 16I When the head approaches the conveyor 51 the latter is retracted by reverse actuation of units 54 to allow the head to cut past bottom centre. Then, the head is traversed up the beam to the limit of tunnel diameter and the beam is rotated for the head to cut out top centre to complete the cutting cycle as shown by FIGURE 16J.

The conveyor 51 is running, in its advanced position, throughout the operations shown in FIGURES 16A to 16H. It is retracted only towards the end of the FIGURE 16H to FIGURE 16I cut and for the whole duration of the FIGURE 16J cut.

The flaps 64 may be actuated regularly or intermittently, piston and cylinder units 74 urging the lower edges of the flaps, during their movement from positions 64B to 64A, into contact with the walls and floor of the tunnel, the pin 67 and sliding connection 65 enabling an accurate follow of the curvature to be achieved and therefore efficient collection of detached material and loading of the latter onto the conveyor 51. For return movements of the flaps from positions 64A to 64B the units 72, 74 are actuated in the reverse direction, the units 74 being actuated firstly, before the units 72, so that the flaps are first raised and then retracted to ensure that the flaps do not drag back any detached material.

Figure 17A:
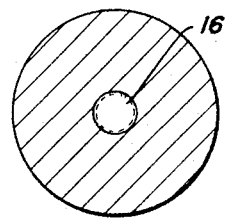
Figure 17B:
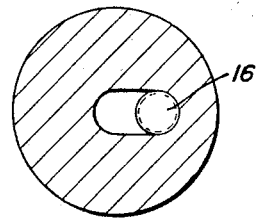
Figure 17E:
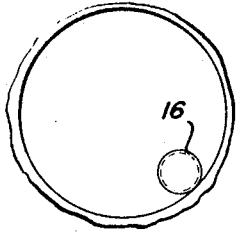
Figure 17D:
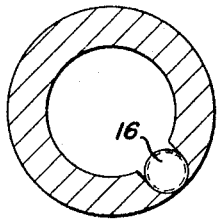
Figure 17C:
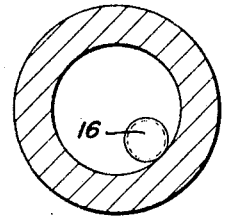

FIGURES 17A to 17E show a method of operating the cutting head of the machine of FIGURES 9 to 11. The head 16 is first sumped in to the face 10 to be removed as illustrated in FIGURE 17A and then moved to the right, FIGURE 17B. Then rotation of the arm through substantially 360° is commenced so that the cutting head removes a circle of material, FIGURE 17C, at a diameter corresponding to the cutting head position of FIGURE 17B. The cutting head 16 is then moved further along the slideway 13 of beam 12 until the position of FIGURE 17D is reached, in this case the position of maximum diameter of the tunnel to be driven. Again the arm is rotated through substantially 360° to complete removal of material over the entire circular section. As previously indicated, the conveyor 51 must be retracted from time to time from its normal advanced operational position, so that it does not foul the cutting head or the end of the beam.

When removal of material over the entire section has been achieved with either the machines of FIGURES 1 to 3 or FIGURES 10 to 12 and methods of FIGURES 16A to 16J or 17A to 17E the torque shaft 11 is retracted and the machine advanced so that the new face 10 can be removed. This is effected by collapsing the piston and cylinder units 41, 42 thus removing the urge on the primary roof support systems to the roof and walls of the tunnel, whilst maintaining the urge of the units 47, 50, on the secondary roof support system. The floats 31, jacks 32 and skid and support plates 33 are then actuated to advance the machine in the manner described in our British patent specification 1,039,983, and simultaneously the piston and cylinder units (not shown) which attach the secondary roof support system to frame 2 are allowed to extend. The piston and cylinder units 41, 42 are then actuated to urge the primary roof support system to the roof of the tunnel whilst the units 47, 50 of the secondary roof support system are collapsed. The piston and cylinder units (not shown) for the secondary roof support system are then retracted to draw the secondary roof support system to the machine. This procedure is then repeated as many times as required (but, as previously indicated, in suitable strata conditions the secondary roof support system may be omitted entirely), the piston and cylinder units 57 forcing the forward end 52 of the conveyor into contact with the floor of the tunnel, irrespective of the inclination of the tunnel, so as to achieve efficient removal of detached material.

With the repetition of this advancing movement it is necessary to carefully control the direction of drive of a tunnel and this direction can be varied for such purposes as bends, the negotiation of inclines or declines, the corrections of direction, or combinations of these, both horizontally and vertically, by suitable control and operation of floats 34, jacks 35, skid and support plates 36 to provide horizontal movement and jacks 36B, to provide vertical movement.

What we claim is:

1. A tunnelling machine comprising a frame, support means for the frame, the support means including power-actuated advancing and retracting mechanism for the frame, an arm mounted forwardly of the frame and rotatable about an axis extending lengthwise of the frame as well as advanceable and retractable with respect to the frame, the arm extending radially from the axis in diametrically opposed directions along a common transverse axis in relation to its axis of rotation and being constituted as a radial slideway, a carrier mounted on the slideway, a pick-carrying rotary cutting head mounted on the carrier and rotatable about an axis parallel to the axis of rotation of the arm, means for moving the carrier along substantially the entire extent of the arm and for retaining it at any position to which it is moved, means for rotating the arm such that the cutting head may remove material over 360° about the axis of rotation of the arm, means for advancing and retracting of the arm with respect to the frame, and means for rotating the rotary cutting head.

2. A tunnelling machine comprising a frame, support means for the frame, the support means including power-actuated advancing and retracting mechanism for the frame, an arm mounted forwardly of the frame and rotatable about an axis extending lengthwise of the frame as well as advanceable and retractable with respect to the frame, the arm extending radially from the axis in diametrically opposed directions along a common transverse axis in relation to its axis of rotation and being constituted as a radial slideway, a carrier mounted on the slideway, a pick-carrying rotary cutting head mounted on the carrier and rotatable about an axis parallel to the axis of rotation of the arm, means for moving the carrier along substantially the entire extent of the arm and for retaining it at any position to which it is moved, means for rotating the arm such that the cutting head may remove material over 360° about the axis of rotation of the arm, means for advancing and retracting of the arm with respect to the frame, and means for rotating the rotary cutting head, said means for roating the arm constituting a link mechanism comprising a curved lever mounted on a fixed pivot in the frame, the lever being pivoted to a curved link pivoted to a lever integral with a torque shaft carrying said arm and disposed along said axis of rotation of the arm, the curved lever being displaceable by hydraulic means.

3. A tunnelling machine as in claim 2 wherein the machine includes means for adjusting the location of the axis of rotation of the arm with respect to the horizontal, so that the vertical direction of forward advance of cutting can be adjusted.

4. A tunnelling machine as in claim 3 wherein the adjusting means comprises transverse pivot pins supporting the frame on the support means, with means to rock the frame about these pins.

5. A tunnelling machine as in claim 2 wherein the machine includes means for adjusting the location of the axis of rotation of the arm with respect to the vertical so that the horizontal direction of forward advance of cutting can be adjusted.

6. A tunnelling machine as in claim 5 wherein the adjusting means is a double support means comprising a lower support means to rest on the floor of the tunnelled section, and an upper support means with freedom to cant to one side or the other of the lower support means.

7. A tunnelling machine as in claim 1 wherein the arm for carrying the cutting head is carried by a torque shaft rotatable in the frame, with means for advancing and retracting the torque shaft.

8. A tunnelling machine as in claim 2 having an overhead articulated primary roof-support system, with means for urging the elements of the system to the roof of the section.

9. A tunnelling machine as in claim 8 wherein the elements are curved plates.

10. A tunnelling machine as in claim 8 wherein a secondary roof support system is provided comprising two horizontal and parallel roof support beams carried by the upper portions of hydraulic piston and cylinder units situated substantially vertically on both sides of the machine, the units seating on the floor of the tunnel that is being driven and having transverse support means and serving to urge the beams to the roof of the tunnel.

11. A tunnelling machine as in claim 8 wherein a secondary roof support system is provided, and is situated behind the machine proper and comprises an articulated system including elements in the form of curved plates and hydraulic piston and cylinder units situated substantially vertically on each side of the tunnel and secured at their upper ends to an overhead element of the articulated system, and at their lower ends to a lower element of the articulated system, with a transverse piston and cylinder unit secured substantially horizontally across the upper ends of two vertical hydraulic piston and cylinder units on opposite sides of the tunnel, the hydraulic units serving to urge the elements to the roof and walls of the tunnel.

12. A tunnelling machine as in claim 11, wherein the secondary support system is attached to the machine frame by double acting hydraulic actuated piston and cylinder units.

13. A tunnelling machine is in claim 2 having associated therewith a tunnelling conveyor for the removal of rock to the rear substantially continuously with the detachment of the rock by the cutting head.

14. A tunnelling machine as in claim 13 wherein the tunnelling conveyor is advanceable and retractable with respect to the machine.

15. A tunnelling machine as in claim 14 wherein the tunnelling conveyor is mounted on the support means between corresponding skid-plates carrying the support means.

16. A tunnelling machine as in claim 15 wherein the tunnelling conveyor is of the scraper chain type and provided with an elevated rear end for ready transfer of rock to a main conveyor, advanced in the rear of the machine in the section already tunnelled.

17. A tunnelling machine as in claim 16 wherein loading means are provided for the tunnelling conveyor.

18. A tunnelling machine as in claim 17 wherein the loading means comprises curved side plates.

19. A tunnelling machine as in claim 17 wherein the loading means comprises curved sections of scraper chain construction.

20. A tunnelling machine as in claim 17 wherein the loading means comprises hinged flaps.

21. A tunnelling machine as in claim 20 wherein the hinged flaps are secured at one end on a substantially vertical pivot adjacent the central tunnelling conveyor and movable towards and away from the conveyor by hydraulic piston and cylinder units.

22. A tunnelling machine as in claim 21 wherein each hinged flap is secured to the vertical pivot through a slidable connection and is also pivoted on a horizontal axis and wherein each hinged flap is provided with a further piston and cylinder unit to rock each flap about the horizontal pivot.

23. A tunnelling machine comprising a frame, support means for the frame, the support means including power-actuated advancing and retracting mechanism for the frame, an arm mounted forwardly of the frame and rotatable about an axis extending lengthwise of the frame as well as advanceable and retractable with respect to the frame, the arm extending radially from the axis in diametrically opposed directions along a common transverse axis in relation to its axis of rotation and being constituted as a radial slideway, a carrier mounted on the slideway, a pick-carrying rotary cutting head mounted on the carrier and rotatable about an axis parallel to the axis of rotation of the arm, means for moving the carrier along substantially the entire extent of the arm and for retaining it at any position to which it is moved, means for rotating the arm such that the cutting head may remove material over 360° about the axis of rotation of the arm, means for advancing and retracting of the arm with respect to the frame, and means for rotating the rotary cutting head, said means for rotating the arm comprising a ring gear secured to the arm via a torque shaft carrying said arm and disposed along said axis of rotation of the arm, said ring gear being driven by a pinion slidably secured to the machine frame to follow the advancing and retracting of said arm with respect to the frame.

24. A tunnelling machine as in claim 23 wherein the pinion is rotated by a slow speed hydraulic motor and associated reduction gear-box also slidably mounted on the machine frame.

References Cited

UNITED STATES PATENTS

| 1,467,513 | 9/1923 | Starr et al. | 299—31 X |
|-----------|--------|--------------|----------|
| 3,190,697 | 6/1965 | Gonski | 299—64 |
| 3,306,663 | 2/1967 | Webster | 299—31 |
| 3,377,105 | 4/1968 | Wallers | 299—31 |

FOREIGN PATENTS 897,307  5/1962  Great Britain.

ERNEST R. PURSER, Primary Examiner

U.S. Cl. X.R.

299—33, 56, 75

PO-1050
(5/69)

UNITED STATES PATENT OFFICE
CERTIFICATE OF CORRECTION

Patent No. 3,467,436            Dated  Sept. 16, 1969

Inventor(s) Gerald R. O. Pentith and Peter Lockwood

It is certified that error appears in the above-identified patent and that said Letters Patent are hereby corrected as shown below:

Column 1, line 39, "leading" should be --loading--.
Column 3, line 69, after "tions" change the comma to a period
Column 4, line 64, "operators platform" should be --operators platform--. Column 8, line 60, "claim 1" should be --claim 2

SIGNED AND
SEALED

DEC 23 1969

(SEAL)
Attest:

Edward M. Fletcher, Jr.
Attesting Officer

WILLIAM E. SCHUYLER, JR.
Commissioner of Patents